(12) United States Patent
Imamura et al.

(10) Patent No.: US 9,233,614 B2
(45) Date of Patent: Jan. 12, 2016

(54) ELECTRIC VEHICLE AND METHOD OF CONTROLLING SAME, FOR PREHEATING OF LUBRICANT

(71) Applicants: Tatsuya Imamura, Okazaki (JP); Tooru Matsubara, Toyota (JP); Kenta Kumazaki, Toyota (JP); Takeshi Kitahata, Toyota (JP); Yasuhiro Hiasa, Nagoya (JP); Atsushi Tabata, Okazaki (JP)

(72) Inventors: Tatsuya Imamura, Okazaki (JP); Tooru Matsubara, Toyota (JP); Kenta Kumazaki, Toyota (JP); Takeshi Kitahata, Toyota (JP); Yasuhiro Hiasa, Nagoya (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/425,299

(22) PCT Filed: Dec. 2, 2013

(86) PCT No.: PCT/IB2013/002682
§ 371 (c)(1),
(2) Date: Mar. 2, 2015

(87) PCT Pub. No.: WO2014/087215
PCT Pub. Date: Jun. 12, 2014

(65) Prior Publication Data
US 2015/0217645 A1 Aug. 6, 2015

(30) Foreign Application Priority Data
Dec. 6, 2012 (JP) .................................. 2012-267189

(51) Int. Cl.
*B60L 9/00* (2006.01)
*B60L 11/18* (2006.01)
(Continued)

(52) U.S. Cl.
CPC . *B60L 11/18* (2013.01); *B60L 1/08* (2013.01); *B60L 3/0023* (2013.01); *B60L 3/0061* (2013.01); *B60L 3/04* (2013.01); *B60L 11/005* (2013.01); *B60L 11/14* (2013.01);
(Continued)

(58) Field of Classification Search
None
See application file for complete search history.

(56) References Cited

U.S. PATENT DOCUMENTS

2009/0023548 A1 1/2009 Imamura et al.
2010/0320019 A1* 12/2010 Gale ..................... B60K 6/445
180/65.27

(Continued)

FOREIGN PATENT DOCUMENTS

EP 1 866 524 B1 2/2010
JP 2003-339101 A 11/2003
(Continued)

*Primary Examiner* — Adam Alharbi
(74) *Attorney, Agent, or Firm* — Oliff PLC

(57) ABSTRACT

In an electric vehicle, an automatic transmission is provided between a differential unit and drive wheels. The differential unit includes a motor-generator and a power split device, and the motor-generator is cooled by lubricant of the automatic transmission. A battery charger is operable to charge a power storage device using a power supply outside the vehicle. When the temperature of the lubricant is lower than a predetermined temperature upon execution of charging of the power storage device using the charger, and the automatic transmission is in a neutral state, or a power cutting-off state, the controller rotates the motor-generator of the differential unit so as to perform warming control for raising the temperature of the lubricant.

18 Claims, 9 Drawing Sheets

(51) Int. Cl.
*B60L 1/08* (2006.01)
*B60L 3/00* (2006.01)
*B60L 11/00* (2006.01)
*B60L 11/14* (2006.01)
*B60L 15/20* (2006.01)
*B60L 3/04* (2006.01)

(52) U.S. Cl.
CPC ......... *B60L 11/1809* (2013.01); *B60L 11/1816* (2013.01); *B60L 11/1851* (2013.01); *B60L 11/1861* (2013.01); *B60L 15/20* (2013.01); *B60L 15/2054* (2013.01); *B60L 2210/10* (2013.01); *B60L 2210/30* (2013.01); *B60L 2210/40* (2013.01); *B60L 2240/12* (2013.01); *B60L 2240/36* (2013.01); *B60L 2240/421* (2013.01); *B60L 2240/423* (2013.01); *B60L 2240/425* (2013.01); *B60L 2240/441* (2013.01); *B60L 2240/443* (2013.01); *B60L 2240/445* (2013.01); *B60L 2240/485* (2013.01); *B60L 2240/486* (2013.01); *B60L 2240/545* (2013.01); *B60L 2240/547* (2013.01); *B60L 2240/549* (2013.01); *B60L 2240/662* (2013.01); *B60L 2240/80* (2013.01); *B60L 2250/24* (2013.01); *B60L 2250/26* (2013.01); *B60L 2260/44* (2013.01); *B60L 2260/58* (2013.01); *Y02T 10/7005* (2013.01); *Y02T 10/7011* (2013.01)

(56) References Cited

U.S. PATENT DOCUMENTS

| | | | |
|---|---|---|---|
| 2011/0095717 | A1 | 4/2011 | Takizawa |
| 2012/0101676 | A1* | 4/2012 | Ichioka ................ B60K 6/445 701/22 |
| 2012/0291750 | A1* | 11/2012 | Yokoyama ............ F01L 1/3442 123/347 |
| 2013/0217539 | A1 | 8/2013 | Natsume |

FOREIGN PATENT DOCUMENTS

| | | |
|---|---|---|
| JP | 2005-348535 A | 12/2005 |
| JP | 2009-089474 A | 4/2009 |
| JP | 2009-202771 A | 9/2009 |
| JP | 2010-110196 A | 5/2010 |
| JP | 2011-089625 A | 5/2011 |
| WO | 2006/115009 A1 | 11/2006 |
| WO | 2012/053116 A1 | 4/2012 |

* cited by examiner

FIG. 4

|     | C1  | C2  | C3  | B1  | B2  | F1  |
|-----|-----|-----|-----|-----|-----|-----|
| 1st | O   |     |     |     | (O) | △   |
| 2nd | O   |     |     | O   |     |     |
| 3rd | O   | O   |     |     |     |     |
| 4th |     | O   |     | O   |     |     |
| R   |     |     | O   |     | O   |     |
| N   |     |     |     |     |     |     |

O : ENGAGED
(O): ENGINE BRAKE APPLIED WHEN ENGAGED
△ : ENGAGED ONLY DURING DRIVING

ELECTRIC VEHICLE AND METHOD OF CONTROLLING SAME, FOR PREHEATING OF LUBRICANT

BACKGROUND OF THE INVENTION

1. Field of the Invention

The invention relates to an electric vehicle and a method of controlling the vehicle. In particular, the invention is concerned with an electric vehicle in which a power storage device that stores electric power for running the vehicle can be charged with electric power from a power supply located outside the vehicle, and a method of controlling this type of vehicle.

2. Description of Related Art

Japanese Patent Application Publication No. 2009-89474 (JP 2009-89474 A) discloses an electric automobile having an on-board battery that can be charged with electric power from an external power supply located outside of the vehicle. In this type of electric automobile, a timer setting device is provided which enables the user to set the charging start time and ending time at which charging of the on-board battery using the external power supply to be started and ended. The timer setting device makes it possible to easily check or confirm the schedule of charging of the on-board battery and preliminary air-conditioning (air-conditioning in the vehicle compartment before boarding) (see JP 2009-89474 A). The related art is also described in Japanese Patent Application Publication No. 2011-89625 A (JP 2011-89625 A) and Japanese Patent Application Publication No. 2010-110196 (JP 2010-110196 A).

In an electric vehicle, such as an electric automobile or a hybrid vehicle, on which an electric motor is installed as a driving source, if the temperature of lubricant for a transmission, gears, etc., provided in a power transmission path between the electric motor and drive wheels is reduced, the viscosity of the lubricant increases, resulting in increase of the rotational resistance. As a result, the power transmission efficiency at which power is transmitted to the drive wheels is reduced, and the distance the electric vehicle is able to travel is shortened.

SUMMARY OF THE INVENTION

The invention provides an electric vehicle in which the temperature of lubricant is sufficiently increased before start of running of the vehicle, so that the distance the electric vehicle is able to travel can be extended as far as possible, and also provides a method of controlling the electric vehicle.

According to one aspect of the invention, an electric vehicle includes a power storage device, a first electric motor, a power transmitting device, a charging device, and a controller. The power storage device is configured to store electric power used for running the vehicle. The first electric motor is configured to receive electric power from the power storage device and generate power. The power transmitting device is provided between the first electric motor and drive wheels, and the power transmitting device is configured to selectively permit and inhibit power transmission between the first electric motor and the drive wheels. The first electric motor is configured to be cooled by lubricant of the power transmitting device. The charging device is configured to charge the power storage device using a power supply located outside of the vehicle. The controller is configured to perform warming control for raising a temperature of the lubricant by rotating the first electric motor, when the temperature of the lubricant is lower than a predetermined temperature at the time of, execution of charging of the power storage device using the charging device and when the power transmitting device is in a power cutting-off state in which the power transmission is inhibited.

The electric vehicle may further include an electric oil pump configured to be electrically driven so as to circulate the lubricant. The controller may be configured to start actuating the electric oil pump before execution of the warming control.

In the electric vehicle as described above, the controller may be configured to perform the warming control using electric power supplied from the power supply, when a quantity of state indicative of the state of charge of the power storage device is larger than a predetermined value.

In the electric vehicle as described above, the controller may be configured to execute charging of the power storage device using the charging device, so that a quantity of state indicative of the state of charge of the power storage device becomes larger than a predetermined value before execution of the warming control.

In the electric vehicle as described above, the controller may be configured to estimate an execution duration of the warming control based on the temperature of the lubricant, the controller being configured to change an execution time at which charging of the power storage device using the charging device is executed, based on the estimated execution duration of the warming control.

The electric vehicle as described above may further include a timer with which a user of the electric vehicle sets a time. The controller may be configured to estimate an operation start scheduled time based on the time set with the timer, the electric vehicle starts being operated at the operation start scheduled time, and the controller being configured to execute the warming control before the estimated operation start scheduled time.

In the electric vehicle as described above, the controller may be configured to execute the warming control before a scheduled ending time at which charging of the power storage device using the charging device ends.

The electric vehicle as described above may further include a second electric motor, and a power split device. The second electric motor may be configured to be cooled by the coolant of the power transmitting device. The power split device may include a first rotary element coupled to the first electric motor, a second rotary element coupled to the second electric motor, and a third rotary element. The controller may be configured to rotate the second electric motor as well as the first electric motor during execution of the warming control.

The electric vehicle as described above may further include a rotation inhibiting device. The rotation inhibiting device may be configured to inhibit rotation of the third rotary element during execution of the warming control. The controller may be configured to rotate the first electric motor and the second electric motor so that torque produced by the first electric motor and torque produced by the second electric motor are balanced with respect to the third rotary element as a point of support, during execution of the warming control. Also, in the electric vehicle as described above, the power transmitting device may be a transmission.

According to another aspect of the invention, a method of controlling an electric vehicle is provided. The electric vehicle includes a power storage device, a first electric motor, a power transmitting device, and a charging device. The power storage device is configured to store electric power used for running the vehicle. The first electric motor is configured to receive electric power from the power storage device and generate power. The power transmitting device is provided between the first electric motor and drive wheels, and the power transmitting device is configured to selectively permit and inhibit power transmission between the first electric motor and the drive wheels. The first electric motor is configured to be cooled by lubricant of the power transmitting device. The charging device is configured to charge the power storage device using a power supply located outside of the vehicle. The control method includes a step of determining whether a temperature of the lubricant is lower than a predetermined temperature at the time of execution of charging of the power storage device using the charging device, a step of determining whether the power transmitting device is in a power cutting-off state in which the power transmission is inhibited, and a step of performing warming control for raising the temperature of the lubricant by rotating the first electric motor, when it is determined that the temperature of the lubricant is lower than the predetermined temperature at the time of execution of charging of the power storage device, and it is determined that the power transmitting device is in the power cutting-off state.

In the electric vehicle and its control method as described above, the power transmitting device is provided between the first electric motor and the drive wheels, and the warming control is performed by rotating the first electric motor when the power transmitting device is in the power cutting-off state, during execution of charging of the power storage device using the charging device. Therefore, the temperature of the lubricant is increased by using heat generated through energization of the first electric motor, and is also increased due to stirring of the lubricant caused by rotation of the first electric motor. Thus, according to this invention, the temperature of the lubricant can be sufficiently elevated before start of running of the vehicle, and the distance the electric vehicle is able to travel can be extended as far as possible.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a view showing an engaging operation table of the automatic transmission shown in FIG. 3;

DETAILED DESCRIPTION OF EMBODIMENTS

Figure 1:
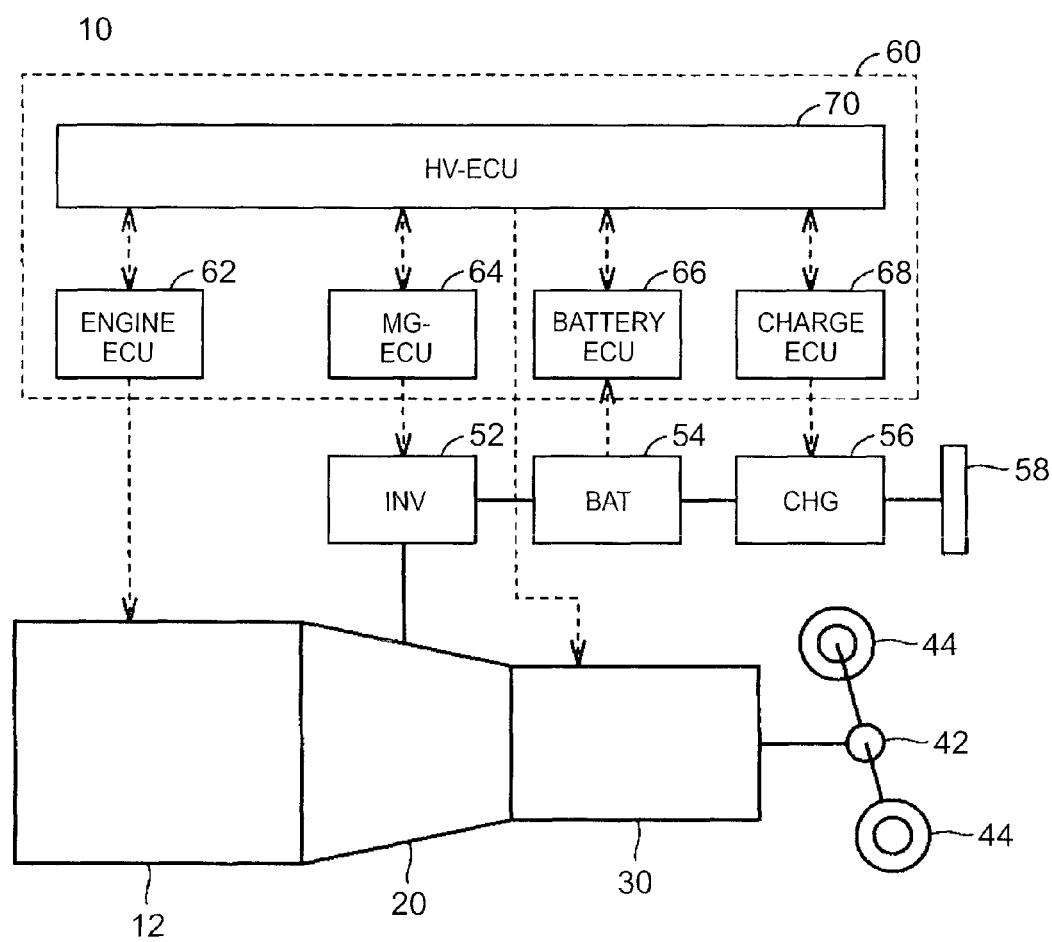
FIG. 1 is a view showing the overall configuration of a hybrid vehicle as one example of electric vehicle according to one embodiment of the invention.

One embodiment of the invention will be described in detail with reference to the drawings. In the drawings, the same reference numerals are assigned to the same or corresponding elements or portions, of which explanation will not be repeated.

Initially, the configuration of an electric vehicle will be described. FIG. 1 shows the overall configuration of a hybrid vehicle 10 as one example of electric vehicle according to one embodiment of the invention. Referring to FIG. 1, the hybrid vehicle 10 includes an engine 12, a differential unit 20, an automatic transmission 30, a differential gear device 42, and drive wheels 44. The hybrid vehicle 10 further includes an inverter 52, a power storage device 54, a battery charger 56, an electric power receiving unit 58, and a controller 60. While the hybrid vehicle 10 is configured as that of a FR (front-engine, rear-drive) type, for example, another drive system may be employed.

The engine 12 is an internal combustion engine, such as a gasoline engine or a diesel engine. The engine 12 converts thermal energy generated by combustion of fuel into kinetic energy of a moving body, such as a piston or a rotor, and delivers the resulting kinetic energy to the differential unit 20. Where the moving body is a piston, and its motion is reciprocating motion, for example, the reciprocating motion is converted into rotary motion via a so-called crank mechanism, and the kinetic energy of the piston is transmitted to the differential unit 20.

The differential unit 20 is coupled to the engine 12. The differential unit 20 includes motor-generators driven by an inverter 52, and a power split device that distributes the output or power of the engine 12 to a transmitting member for transmitting power to the automatic transmission 30, and the motor-generators, as will be described later. The structure of the differential unit 20 will be described in detail later.

The automatic transmission 30 is coupled to the differential unit 20, and is operable to change the ratio (speed ratio) between the rotational speed of the transmitting member (which also serves as an input shaft of the automatic transmission 30) connected to the differential unit 20, and the rotational speed of a drive shaft (an output shaft of the automatic transmission 30) connected to the differential gear device 42. When a certain clutch (which will be described later) is released, the automatic transmission 30 is able to form a neutral state in which power transmission between the differential unit 20 and the differential gear device 42 (drive wheels 44) is cut off or blocked. In this embodiment, the automatic transmission 30 is a stepwise variable transmission that has two or more gear positions and is able to change the gear ratio in steps. However, the automatic transmission 30 may be a continuously variable transmission. The differential gear device 42 is coupled to the output shaft of the automatic transmission 30, and transmits power from the automatic transmission 30 to the drive wheels 44. The structure of the automatic transmission 30, as well as that of the differential unit 20, will be described in detail later.

The inverter 52 is electrically connected to the power storage device 54, and drives the motor-generators included in the differential unit 20, based on a control signal from the controller 60. The inverter 52 is provided by a bridge circuit including power semiconductor switching elements for three phases, for example. Although not particularly illustrated in the drawings, a voltage converter may be provided between the inverter 52 and the power storage device 54.

The power storage device 54 is a rechargeable DC power supply, which is, typically, a secondary battery, such as a lithium-ion battery or a nickel-metal-hydride battery. The power storage device 54 stores electric power for running the vehicle, and supplies the stored power to the inverter 52. The power storage device 54 is charged with electric power received from the power receiving unit 58. The power receiving unit 58 receives the electric power from a power supply (not shown) located outside of the vehicle (which will be called "external power supply", and charging of the power storage device 54 by use of the external power supply will be called "external charging"). The power storage device 54 is also charged with electric power generated by the motor-generator of the differential unit 20 and received from the inverter 52. The power storage device 54 may consist of a power storage element, such as an electric double layer capacitor, in place of the secondary battery.

The battery charger 56 is electrically connected to between the power storage device 54 and the power receiving unit 58, and is operable to convert electric power received from the power receiving unit 58 during external charging, into power having a voltage level of the power storage device 54, and charge the power storage device 54 with the power. The power receiving unit 58 may be a connector, a plug, or the like, which is electrically connected to the external power supply, or may be a coil, an antenna, or the like, which contactlessly receives electric power from the external power supply.

The controller 60 includes an engine ECU (Electronic Control Unit) 62, MG-ECU 64, battery ECU 66, Charge ECU 68, and HV-ECU 70. Each of the ECUs includes a CPU (Central Processing Unit), storage device, input and output buffers, etc., (all of which are not shown), and performs various control operations as will be described later. The control operations performed by each ECU are not limited to processing using software, but may be implemented by dedicated hardware (electronic circuits). While the ECUs as indicated above constitute the controller 60, the controller 60 may consist of a single ECU.

The engine ECU 62 produces signals, such as a throttle signal, ignition signal, and a fuel injection signal, for driving the engine 12, based on an engine torque command, etc. received from the HV-ECU 70, and outputs the produced signals to the engine 12. The MG-ECU 64 produces a control signal for controlling the inverter 52, based on a command from the HV-ECU 70, and outputs the produced control signal to the inverter 52.

The battery ECU 66 estimates the state of charge (which is also called "SOC") of the power storage device 54, based on the voltage and current of the power storage device 54 detected by a voltage sensor and a current sensor (not shown), respectively, and outputs the estimation result to the HV-ECU 70. The SOC is expressed as a percentage between 0% and 100% where 100% represents the fully charged state. The charge ECU 68 produces a control signal for controlling the battery charger 56, based on a command from the HV-ECU 70, and outputs the produced control signal to the battery charger 56.

The HV-ECU 70 receives detection signals from various sensors, and produces various commands for controlling respective devices of the hybrid vehicle 10. As one of major controls performed by the HV-ECU 70, the HV-ECU 70 performs warming control for raising the temperature of lubricant commonly used by the differential unit 20 and the automatic transmission 30. More specifically, when the temperature of the lubricant is low at the time of execution of external charging, and the automatic transmission 30 is in a neutral state (power cut-off state), the HV-ECU 70 produces a command to drive the battery charger 56, and outputs the command to the charge ECU 68, and the HV-ECU 70 also produces current commands to rotate the motor-generators included in the differential unit 20, and outputs the command to the MG-ECU 64. The warming control will be described in detail later.

Figure 2:
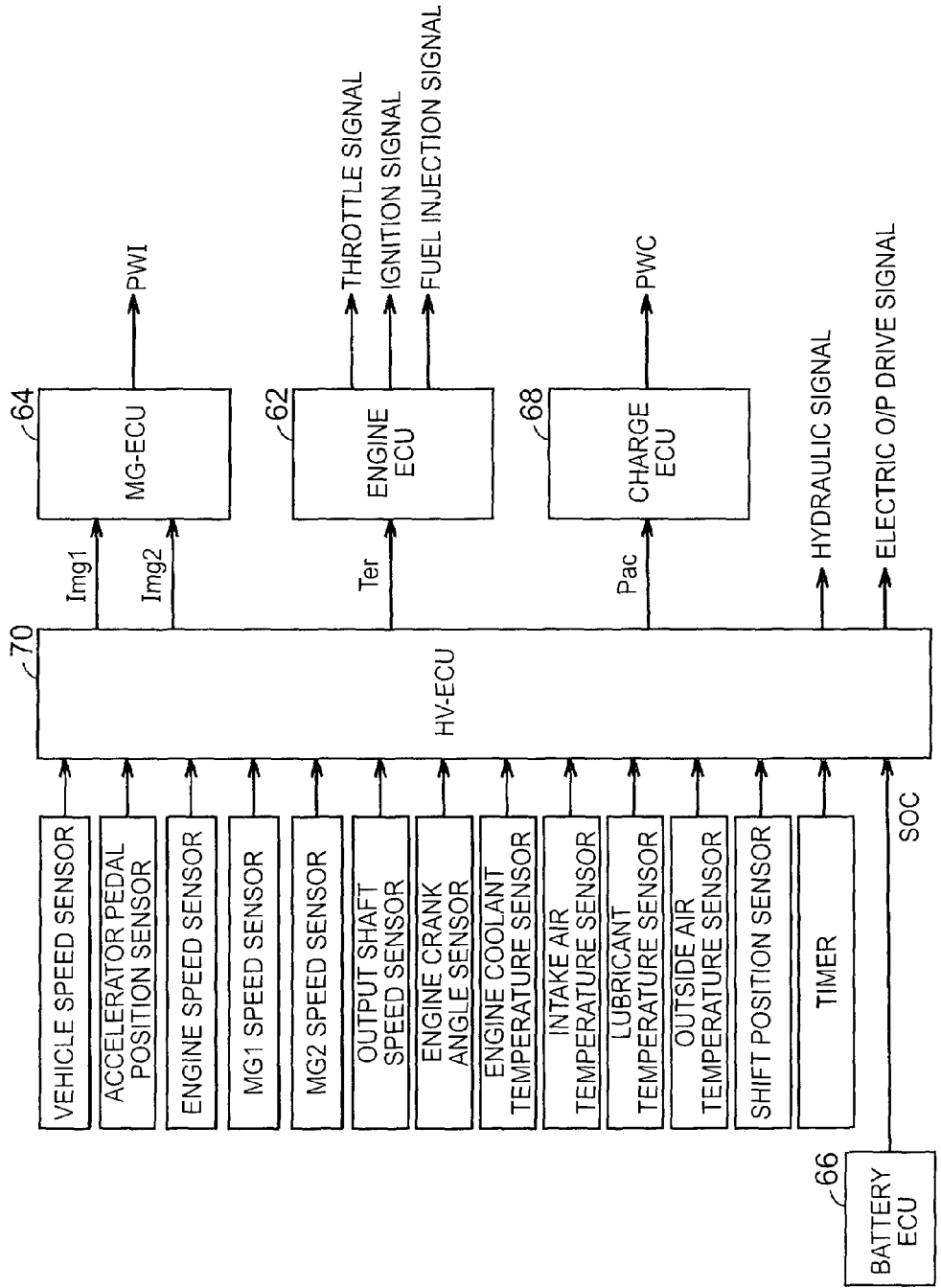
FIG. 2 is a view showing major signals received by and generated from a controller shown in FIG. 1.

FIG. 2 shows main signals sent to and received from the controller 60 shown in FIG. 1. Referring to FIG. 2, the HV-ECU 70 receives a signal from a vehicle speed sensor that detects the speed of the hybrid vehicle 10, a signal from an accelerator pedal position sensor that detects the operation amount of the accelerator pedal, a signal from an engine speed sensor that detects the rotational speed of the engine 12, a signal from an MG1 speed sensor that detects the rotational speed of a motor-generator MG1 (which will be described) included in the differential unit 20, and a signal from an MG2 speed sensor that detects the rotational speed of a motor-generator MG2 (which will be described) included in the differential unit 20. The HV-ECU 70 also receives a signal from an output shaft speed sensor that detects the rotational speed of an output shaft of the differential unit 20 (which is also the input shaft of the automatic transmission 30), a signal from an engine crank angle sensor that detects the crank angle of the engine 12, a signal from an engine coolant temperature sensor that detects the temperature of a coolant of the engine 12, a signal from an intake air temperature sensor that detects the temperature of air drawn into the engine 12, and a signal from lubricant temperature sensor that detects the temperature of the lubricant of the differential unit 20 and the automatic transmission 30. In addition, the HV-ECU 70 further receives a signal from an outside air temperature sensor that detects the temperature of outside air around the hybrid vehicle 10, a signal from a shift position sensor that detects a shift position designated by a shift lever, a signal from a timer with which the user is able to set the time at which external charging is scheduled to be finished, the time at which the hybrid vehicle 10 is scheduled to start being operated after external charging, etc., a signal indicative of the SOC of the power storage device 54 estimated by the battery ECU 66, and so forth.

Then, the HV-ECU 70 produces an engine torque command Ter indicative of target output torque of the engine 12, for example, based on the above-indicated signals, and outputs the command Ter to the engine ECU 62. The engine ECU 62, which receives the engine torque command Ter, produces a throttle signal, ignition signal, fuel injection signal, etc., for driving the engine 12, and outputs these signals to the engine 12.

The HV-ECU 70 also produces current commands Img1, Img2 to drive the motor-generators MG1, MG2 of the differential unit 20, and outputs the commands to the MG-ECU 64. The HV-ECU 70 also produces a charge command Pac to drive the battery charger 56, and outputs the command Pac to the charge ECU 68, and the HV-ECU 70 further produces, a hydraulic signal for driving the automatic transmission 30, and outputs the hydraulic signal to a hydraulic control unit (not shown). Also, the HV-ECU 70 produces a signal as a command to drive an electric oil pump (not shown) for circulating the lubricant, and outputs the signal to the electric oil pump.

The MG-ECU 64, which receives the current commands Img1, Img2 from the HV-ECU 70, produces a signal PWI for controlling the inverter 52 so that currents corresponding to the current commands Img1, Img2 flow through the motor-generators MG1, MG2, respectively, and outputs the thus produced signal PWI to the inverter 52. The charge ECU 68, which receives the charge command Pac from the HV-ECU 70, produces a signal PWC for controlling the battery charger 56 so that the power storage device 54 is charged with electric power corresponding to the charge command Pac, and outputs the thus produced signal PWC to the battery charger 56.

Figure 3:
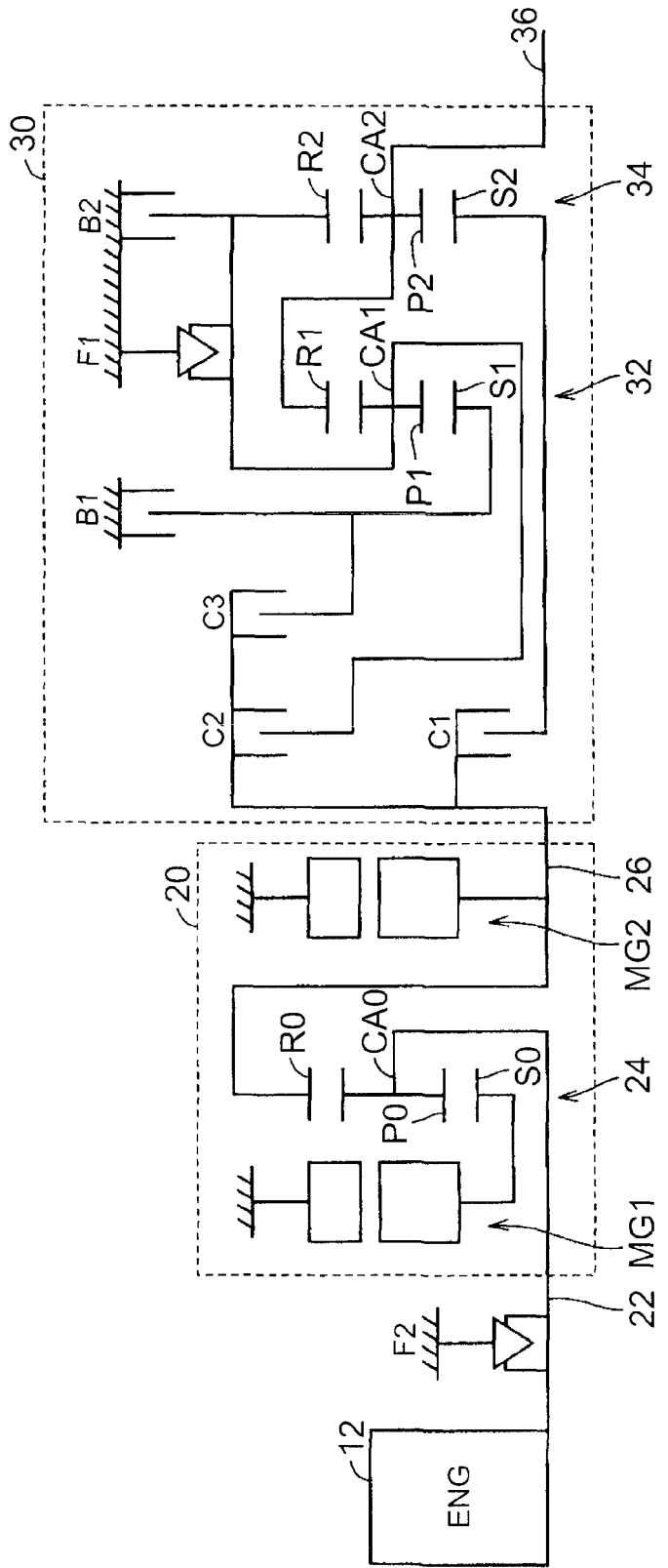
FIG. 3 is a view showing the structures of a differential unit and an automatic transmission shown in FIG. 1.

Next, the structures of the differential unit and the automatic transmission will be described. FIG. 3 shows the structures of the differential unit 20 and the automatic transmission 30 shown in FIG. 1. The differential unit 20 and the automatic transmission 30 are constructed symmetrically with respect to the axis thereof; therefore, the lower halves of the differential unit 20 and the automatic transmission 30 are not illustrated in FIG. 3.

Referring to FIG. 3, the differential unit 20 includes motor-generators MG1, MG2, and a power split device 24. Each of the motor-generators MG1, MG2 is an AC rotary electric machine, such as a permanent-magnet-type synchronous motor including a rotor in which a permanent magnet is embedded. The motor-generators MG1, MG2 are driven by the inverter 52 (FIG. 1). The motor-generators MG 1, MG2 are cooled by use of the lubricant of the automatic transmission 30 and the power split device 24. On the other hand, the motor-generators MG1, MG2 are driven by the inverter 52 when the temperature of the lubricant is low, so as to raise the temperature of the lubricant, using heat generated by energization of the motor-generators and stirring of the lubricant due to rotation of the motor-generators.

The power split device 24 is a single-pinion-type planetary gear set, and includes a sun gear S0, a pinion P0, a carrier CA0, and a ring gear R0. The carrier CA0 is coupled to an input shaft 22, namely, the output shaft of the engine 12, and supports the pinion P0 such that the pinion P0 is able to rotate about itself and about the sun gear S0. The sun gear S0 is coupled to the rotary shaft of the motor-generator MG1. The ring gear R0 is coupled to the transmitting member 26, and is arranged to mesh with the sun gear S0 via the pinion P0. The rotary shaft of the motor-generator MG2 is coupled to the transmitting member 26. Namely, the ring gear R0 is also coupled to the rotary shaft of the motor-generator MG2.

The power split device 24 functions as a differential device in which the sun gear S0, carrier CA0 and the ring gear R0 rotate relative to each other. The respective rotational speeds of the sun gear S0, carrier CA0 and the ring gear R0 are related to be connected by a straight line as indicated in the nomographic chart (FIG. 5) which will be described later. Due to the differential function of the power split device 24, the power generated from the engine 12 is distributed to the sun gear S0 and the ring gear R0. Then, the motor-generator MG1 operates as a generator, using the power delivered to the sun gear S0, and electric power generated by the motor-generator MG1 is supplied to the motor-generator MG2 or stored in the power storage device 54 (see FIG. 1). The motor-generator MG1 generates electric power, using power divided by the power split device 24, and the motor-generator MG2 is driven, using electric power generated by the motor-generator MG1, so that the differential unit 20 functions as a continuously variable transmission.

A one-way clutch F2 is provided on the input shaft 22 connected to the carrier CA0. The one-way cutch F2 supports the input shaft 22 such that the input shaft 22 can rotate in a positive rotational direction (the rotational direction of the input shaft 22 during operation of the engine 12), and cannot rotate in a negative rotational direction.

The automatic transmission 30 includes single-pinion-type planetary gear sets 32, 34, clutches C1-C3, brakes B1, B2, and a one-way clutch F1. The planetary gear set 32 includes a sun gear S1, a pinion P1, a carrier CA1, and a ring gear R1. The planetary gear set 34 includes a sun gear S2, a pinion P2, a carrier CA2, and a ring gear R2.

Each of the clutches C1-C3 and the brakes B1, B2 is a friction coupling device that operates under hydraulic pressure, and may be a wet multiple disc type friction device having a plurality of friction plates stacked together and adapted to be pressed under hydraulic pressure, or a band brake in which one end of a band wound on an outer circumferential surface of a rotating drum is adapted to be pulled under hydraulic pressure so as to tighten the band, or the like. The one-way clutch F1 supports the carrier CA1 and the ring gear R2 coupled to each other, such that the carrier CA1 and the ring gear R2 can rotate in one direction, and cannot rotate in the other direction.

In the automatic transmission 30, the coupling devices, i.e., the clutches C1-C3, brakes B1, B2, and the one-way clutch F1, are engaged according to an engaging operation table shown in FIG. 4, so that a selected one of the first-speed gear position through the fourth-speed gear position, and the reverse-drive gear position, is established. In FIG. 4, "O" indicates that the coupling device in question is in an engaged state, and "(O)" indicates that an engine brake is applied when the coupling device is engaged, while "Δ" indicates that the coupling device is engaged only during driving, and blank indicates that the coupling device is in a released state. The automatic transmission 30 can be placed in a neutral state (in which power transmission is cut off), by releasing all of the coupling devices, i.e., the clutches C1-C3 and the brakes B1, B2.

Referring again to FIG. 3, the differential unit 20 and the automatic transmission 30 are coupled to each other by the transmission member 26. The output shaft 36 coupled to the carrier CA2 of the planetary gear set 34 is coupled to the differential gear device 42 (FIG. 1).

Figure 5:
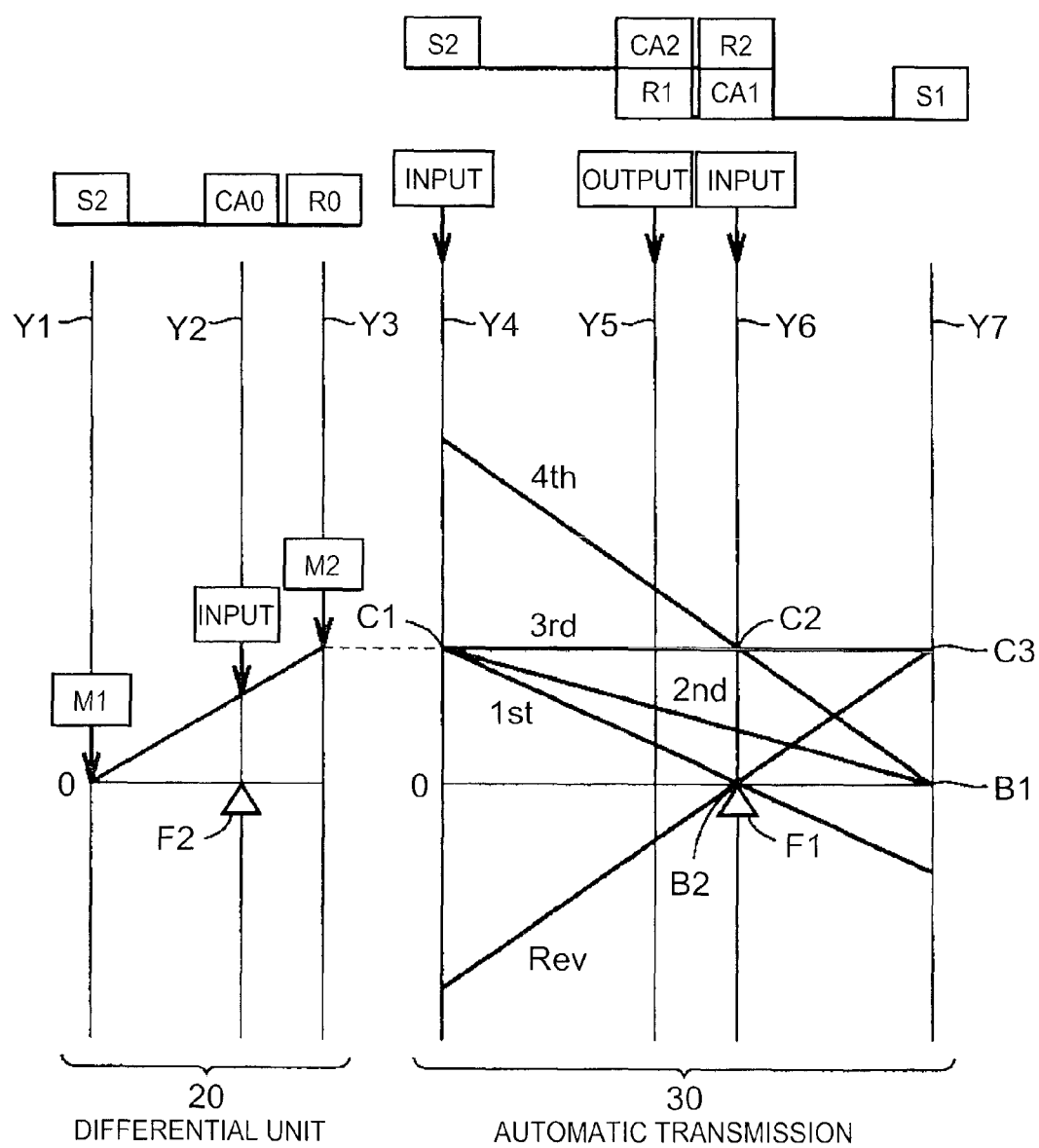
FIG. 5 is a nomographic chart of a shifting mechanism constituted by the differential unit and the automatic transmission shown in FIG. 3.

FIG. 5 is a nomographic chart of a speed change mechanism constituted by the differential unit 20 and the automatic transmission 30. Referring to FIG. 3 along with FIG. 5, a vertical line Y1 in the nomographic chart corresponding to the differential unit 20 indicates the rotational speed of the sun gear S0 of the power split device 24, namely, the rotational speed of the motor-generator MG1. A vertical line Y2 indicates the rotational speed of the carrier CA0 of the power split device 24, namely, the rotational speed of the engine 12. A vertical line Y3 indicates the rotational speed of the ring gear R0 of the power split device 24, namely, the rotational speed of the motor-generator MG2. The intervals among the vertical lines Y1-Y3 are determined according to the gear ratio of the power split device 24.

In the nomographic chart corresponding to the automatic transmission 30, a vertical line Y4 indicates the rotational speed of the sun gear S2 of the planetary gear set 34, and a vertical line Y5 indicates the rotational speed of the carrier CA2 of the planetary gear set 34 and the ring gear R1 of the planetary gear set 32 which are coupled to each other. A vertical line Y6 indicates the rotational speed of the ring gear R2 of the planetary gear set 34 and the carrier CA1 of the planetary gear set 32 which are coupled to each other, and a vertical line Y7 indicates the rotational speed of the sun gear S1 of the planetary gear set 32. The intervals among the vertical lines Y4-Y7 are determined according to the gear ratios of the planetary gear sets 32, 34.

When the clutch C1 is engaged, the sun gear S2 of the planetary gear set 34 is coupled to the ring gear R0 of the differential unit 20, so that the sun gear S2 rotates at the same speed as the ring gear R0. When the clutch C2 is engaged, the carrier CA1 of the planetary gear set 32 and the ring gear R2 of the planetary gear set 34 are coupled to the ring gear R0, so that the carrier CA1 and the ring gear R2 rotate at the same speed as the ring gear R0. When the clutch C3 is engaged, the sun gear S1 of the planetary gear set 32 is coupled to the ring gear R0, so that the sun gear S1 rotates at the same speed as the ring gear R0. The rotation of the sun gear S1 is stopped when the brake B1 is engaged, and the rotation of the carrier CA1 and the ring gear R2 is stopped when the brake B2 is engaged.

For example, when the clutch C1 and the brake B1 are engaged, and the remaining clutches and brake are released, as indicated in the engaging operation table of FIG. 4, a straight line denoted as "2nd" is selected in the nomographic chart of the automatic transmission 30. The vertical line Y5 indicating the rotational speed of the carrier CA2 of the planetary gear set 34 indicates the output rotational speed (the rotational speed of the output shaft 36) of the automatic transmission 30. Thus, in the automatic transmission 30, the clutches C1-C3 and the brakes B1, B2 are selectively engaged and released according to the engaging operation table of FIG. 4, so that the first-speed gear position through the fourth-speed gear position, reverse-drive gear position, and the neutral state can be formed.

In the differential unit 20, on the other hand, the rotations of the motor-generators MG1, MG2 are controlled as appropriate, so that the rotational speed of the ring gear R0, namely, the rotational speed of the transmitting member 26, can be continuously varied, relative to a given rotational speed of the engine 12 coupled to the carrier CA0, to thus make the speed ratio steplessly or continuously variable. By coupling the automatic transmission 30 capable of changing the speed ratio between the transmitting member 26 and the output shaft 36, to the differential unit 30 having the stepless speed changing function, it is possible to reduce the speed ratio of the differential unit 20, while assuring the stepless speed changing function of the differential unit 20, thereby to reduce losses of the motor-generators MG1, MG2.

FIG. 5. shows an operating state of the differential unit 20, as one example, in which the rotational speed of the motor-generator MG1 (the rotational speed of the sun gear S0) is equal to 0. This operating state is called "mechanical point" at which no electric power flows into the motor-generator MG1, and the power of the engine 12 is transmitted without being converted into electric energy. At the "mechanical point", neither "power diversion" nor "power circulation" takes place, and the power transmission efficiency is high. In the "power diversion", electric power generated by the motor-generator MG1 using the power of the engine 12 is supplied to the motor-generator MG2, so that driving force is generated. In the "power circulation", electric power generated by the motor-generator MG2 flows into the motor-generator MG1. In the hybrid vehicle 10 of this embodiment, two or more "mechanical points" can be formed in the differential unit 20, according to the gear position of the automatic transmission 30, so that a high power transmission efficiency can be achieved under various running conditions.

Since the automatic transmission 30 can be placed in the neutral state, as described above, the motor-generators MG1, MG2 of the differential unit 20 can be rotated in a condition where power is inhibited from being transmitted to the drive wheels 44. In this embodiment, when the temperature of the lubricant is low at the time of execution of external charging, and the automatic transmission 30 is in the neutral state, the warming control for raising the temperature of the lubricant is executed by rotating the motor-generators MG1, MG2. Namely, since the automatic transmission 30 is in the power cut-off condition, the warming control using the motor-generators MG1, MG2 is carried out without delivering driving force to the drive wheels 44.

Figure 6:
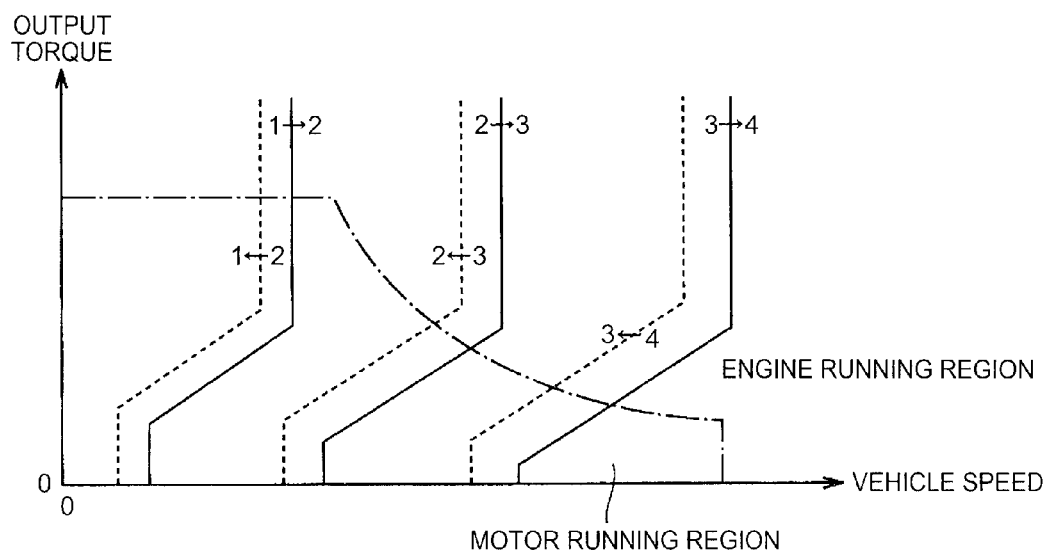
FIG. 6 is a view showing a shift diagram of the automatic transmission shown in FIG. 3.

Gear shifting by the differential unit 20 and the automatic transmission 30 as described above is controlled based on a shift diagram as indicated in FIG. 6, for example. Referring to FIG. 6, the horizontal axis indicates the vehicle speed, and the vertical axis indicates output torque of the hybrid vehicle 10, which is calculated from the accelerator operation amount, the vehicle speed, etc. It is to be understood that parameters that determine change of speeds are not limited to these parameters.

In FIG. 6, solid lines are upshift lines, and dashed lines are downshift lines. A region surrounded by a one-dot chain line represents a motor running region (EV running region) in which the engine 12 is stopped and the vehicle runs using only the driving force of the motor-generator MG2. During EV running, the engine 12 is stopped unless a request for charging of the power storage device 54 due to reduction of the SOC, or a request for warming up a catalyst (not shown), or the like, is issued. In a region outside the region surrounded by the one-dot chain line, the engine 12 is operated, so that the vehicle runs using only the driving force generated from the engine 12, or the vehicle runs in an HV running mode, using the driving force of the motor-generator MG2 in addition to the driving force generated from the engine 12. Shifting is also performed while the vehicle is running, in the EV running mode.

Figure 7:
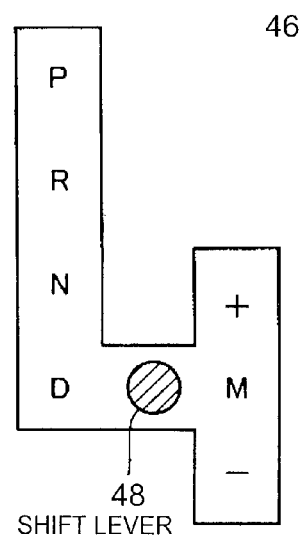
FIG. 7 is a view showing one example of shifting device used for selecting the shift position.

FIG. 7 shows one example of shifting device used for switching or changing the shift position. Referring to FIG. 7, the shifting device 46 is installed beside the driver's seat, for example, and is provided with a shift lever 48 that is operated for selecting one of a plurality of shift positions.

The shift lever 48 can be manually operated to a parking position "P (Parking)", reverse-drive running position "R (Reverse)", neutral position "N (Neutral)", forward-drive automatic-shift running position "D (Drive)", or a forward-drive manual-shift running position "M (Manual)". When the shift lever 48 is in the "P" position, a neutral state is established in which the power transmission path in the automatic transmission 30 is cut off or blocked, and the output shaft of the automatic transmission 30 is locked. When the shift lever 48 is in the "R" position, the reverse-drive gear position for running the vehicle in the reverse direction is selected. When the shift lever 48 is in the "N" position, a neutral state is established in which the power transmission path in the automatic transmission 30 is cut-off or blocked. Namely, the "N" position and the above-indicated "P" position are non-running positions (non-drive positions) in which the automatic transmission 30 is placed in a power cutting-off state. When the shift lever 48 is in the "D" position, automatic shift control is performed within a range in which the speed ratio or gear ratio can be changed by the differential unit 20 and the automatic transmission 30. When the shift lever 48 is in the "M" position, a manual shift running mode (manual mode) is established, and a so-called shift range is set while restricting a high-speed gear position(s) established under the automatic shift control.

Next, the warming control will be described. In the hybrid vehicle 10, the lubricant is commonly used in or shared by the differential unit 20 and the automatic transmission 30. If the temperature of the lubricant is reduced, the viscosity of the lubricant is increased, whereby the rotational resistance increases in the differential unit 20 and the automatic transmission 30. As a result, the power transmission efficiency of the differential unit 20 and the automatic transmission 30 is reduced, and the distance the hybrid vehicle 10 is able to travel is shortened.

In this embodiment, when the temperature of the lubricant is low, the warming control for raising the temperature of the lubricant, using the motor-generators MG1, MG2, is performed. More specifically, when the automatic transmission 30 is in a neutral state (when "N" position or "P" position is selected), electric current is passed through the motor-generators MG1, MG2 of the differential unit 20, so as to rotate the motor-generators MG1, MG2. In this manner, the lubricant is warmed, due to heat generated by energization of the motor-generators MG1, MG2, and stirring of the lubricant caused by rotation of the motor-generators MG1, MG2. The power generated from rotation of the motor-generators MG1, MG2 is blocked by the automatic transmission 30. When the automatic transmission 30 is not in the neutral state when the warming control is executed, the automatic transmission 30 may be positively controlled so that it is placed in the neutral state.

The power transmission efficiency will be enhanced if the temperature of the lubricant is elevated through the warming control using the motor-generators MG1, MG2; however, if electric power is taken out of the power storage device 54 during the warming control, the distance the hybrid vehicle 10 is able to travel will be eventually shortened. Thus, in this embodiment, the warming control is executed during execution of external charging. Namely, when the temperature of the lubricant is low at the time of execution of external charging, the battery charger 56 is operated, and the motor-generators MG1, MG2 are rotated if the automatic transmission 30 is in the neutral state ("N" position or "P" position"). Thus, the motor-generators MG1, MG2 can be driven during execution of the warming control, using electric power supplied from the external power supply, and the warming control can be implemented without taking electric power out of the power storage device 54.

Figure 8:
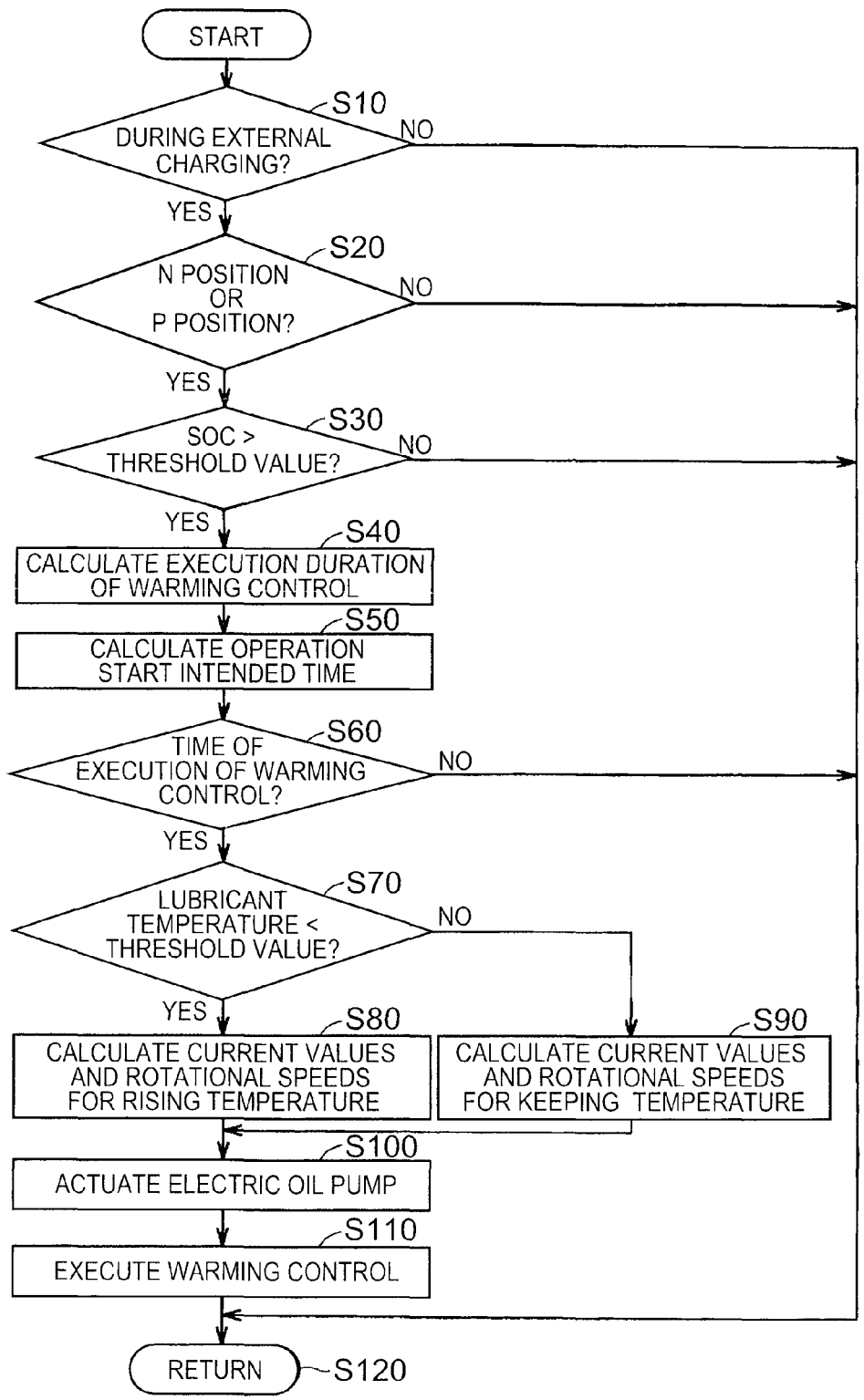
FIG. 8 is a flowchart explaining the processing procedure of lubricant warming control executed by the controller shown in FIG. 1.

FIG. 8 is a flowchart explaining the processing procedure of the control for raising the temperature of the lubricant, which control is executed by the controller 60 shown in FIG. 1. Each step in the flowchart is implemented when a program stored in advance in the controller 60 is called for from a main routine and is executed at given intervals or when a given condition(s) is/are satisfied. For all or part of the steps in the flowchart, processing may be realized by constructing dedicated hardware (electronic circuit).

Referring to FIG. 8, the controller 60 determines whether the power storage device 54 is being externally charged using the battery charger 58 (step S10). If the power storage device 54 is not being externally charged, the control proceeds to step S120 without performing a series of operations as indicated below.

If it is determined in step S10 that the power storage device 54 is being externally charged (YES in step S10), the. controller 60 determines whether the currently selected shift position is the "N" position or the "P" position, namely, whether the automatic transmission. 30 is in the neutral state (power cutting-off state) (step S20). If the currently selected shift position is any position other than the "N" position and the "P" position (NO in step S20), the control proceeds to step S120.

If it is determined in step S20 that the shift position is the "N" position or the "P" position (YES in step S20), the controller 60 determines whether the SOC of the power storage device 54 is higher than a predetermined threshold value (step S30). The threshold value is a value used for determining whether the power storage device 54 is sufficiently charged. If the SOC is equal to or lower than the threshold value (NO in step S30), the control proceeds to step S120.

Namely, in this embodiment, the SOC is required to be high, as a condition of execution of warming control for increasing the temperature of the lubricant. As described above, the warming control is executed during external charging, and electric power supplied from the external power supply is used for the warming control. It is thus desirable for the external power supply to have a sufficient power supply ability to carry out charging of the power storage device 50 and supply of electric power to the motor-generators MG1, MG2 for the warming control at the same time. However, the external power supply may not have such a power supply ability. Thus, in this embodiment, the amount of charge of the power storage device 54, which dominantly determines the distance the vehicle can run in the EV mode, is preferentially made sufficiently large, and the warming control can be executed on a condition that the SOC of the power storage device 54 is sufficiently high. In other words, charging of the power storage device 54 is carried out so that the SOC of the power storage device 54 is sufficiently increased before execution of the warming control.

While the SOC is used as a quantity of state indicative of the state of charge of the power storage device 54, the SOC may be replaced by another quantity of state (such as a voltage of the power storage device 54) indicative of the state of charge of the power storage device 54, and it may be determined whether the power storage device 54 is sufficiently charged, by comparing the quantity of state with a given threshold value.

If it is determined in step S30 that the SOC is higher than the threshold value (YES in step S30), the controller 60 calculates the execution duration of the warming control (step S40). As one example, the controller 60 calculates a duration or length of time required to raise the temperature of the lubricant to a target temperature, based on the temperature of the lubricant detected by lubricant temperature sensor, the temperature of outside air detected by an outside air temperature sensor, and so forth.

Then, the controller 60 calculates the operation start intended time at which the hybrid vehicle 10 is intended to start being operated (step S50). The operation start intended time is calculated, so that the warming control as well as external charging ends before the scheduled time at which the hybrid vehicle 10 starts being operated. The operation start intended time may be directly set with a timer (FIG. 2) that can be operated by the user, or may be calculated from a predetermined time (e.g., in the morning) at which external charging is supposed to end.

Subsequently, the controller 60 determines whether it is the time of execution of the warming control, based on the operation start intended time calculated in step S50, and the execution duration of the warming control calculated in step S40 (step S60). More specifically, the controller 60 calculates the time of execution of the warming control by subtracting the execution duration of the warming control calculated in step S40 and a suitable extra period of time, from the operating start intended time calculated in step S50, and determines whether it is the calculated time of execution of the warming control. If it is not the time of execution of the warming control (NO in step S60), the control proceeds to step S120.

If it is determined in step S60 that it is the time of execution of the warming control (YES in step S60), the controller 60 determines whether the temperature of the lubricant detected by the lubricant temperature sensor is lower than a predetermined threshold value (step S70). If it is determined that the temperature of the lubricant is lower than the threshold value (YES in step S70), the controller 60 calculates values of current passed through the motor-generators MG1, MG2 and the rotational speeds of the motor-generators MG1, MG2, which are required so as to raise the temperature of the lubricant (step S80). The current values and the rotational speeds may be determined based on maps or calculation formulas, etc., prepared in advance in accordance with the temperature of the lubricant detected by the lubricant temperature sensor, or may be determined so that large current flows through the motor-generator that is more likely to soak in the lubricant, based on the inclination of the vehicle body detected by an inclination sensor (not shown), for example.

If it is determined in step S70 that the temperature of the lubricant is equal to or higher, than the threshold value (NO in step S70), the controller 60 calculates values of current passed through the motor-generators MG1, MG2 and the rotational speeds of the motor-generators MG1, MG2, which are required so as to keep the temperature of the lubricant (step S90). The current values and rotational speeds for keeping the temperature of the lubricant are smaller or lower than the current values and rotational speeds for raising the temperature, which are calculated in step S80.

Then, the controller 60 actuates the electric oil pump for circulating the lubricant (step S100). Namely, the external charging is conducted after running of the vehicle (for example, late at night after coming home), and the lubricant is back in an oil pan at the time of external charging; therefore, the electric oil pump is actuated before execution of the warming control, so as to prevent the clutches (clutches C1-C3) and shafts of the automatic transmission 30 from being burnt out due to rotation of the motor-generators MG1, MG2 under the warming control. After the electric oil pump is actuated, the controller 60 controls the inverter 52 so that the motor-generators MG1, MG2 operate according to the current values and rotational speeds calculated in step S80 or step S90, to thus perform the warming control (step S110).

While the start time of the warming control is determined based on the execution duration of the warming control calculated in step S40 in the control routine as described above, the warming control is executed under the condition that the SOC of the power storage device 54 is higher than the threshold value. Thus, the time of execution of the external charging (the time at which charging of the power storage device 54 is started) may be determined, or the charging electric power for use in the external charging may be increased (rapid charging may be carried out), based on the execution duration of the warming control, so that the SOC of the power storage device 54 reaches the threshold value at the start of the warming control.

In the control routine as described above, the lubricant warming control can be executed, on the condition that the currently selected shift position is the "N" position or the "P" position. However, when the shift position selected at the time of execution of the warming control is any position other than the "N" position and the "P" position, the shift position may be positively changed to the "N" position or the "P" position.

Figure 9:
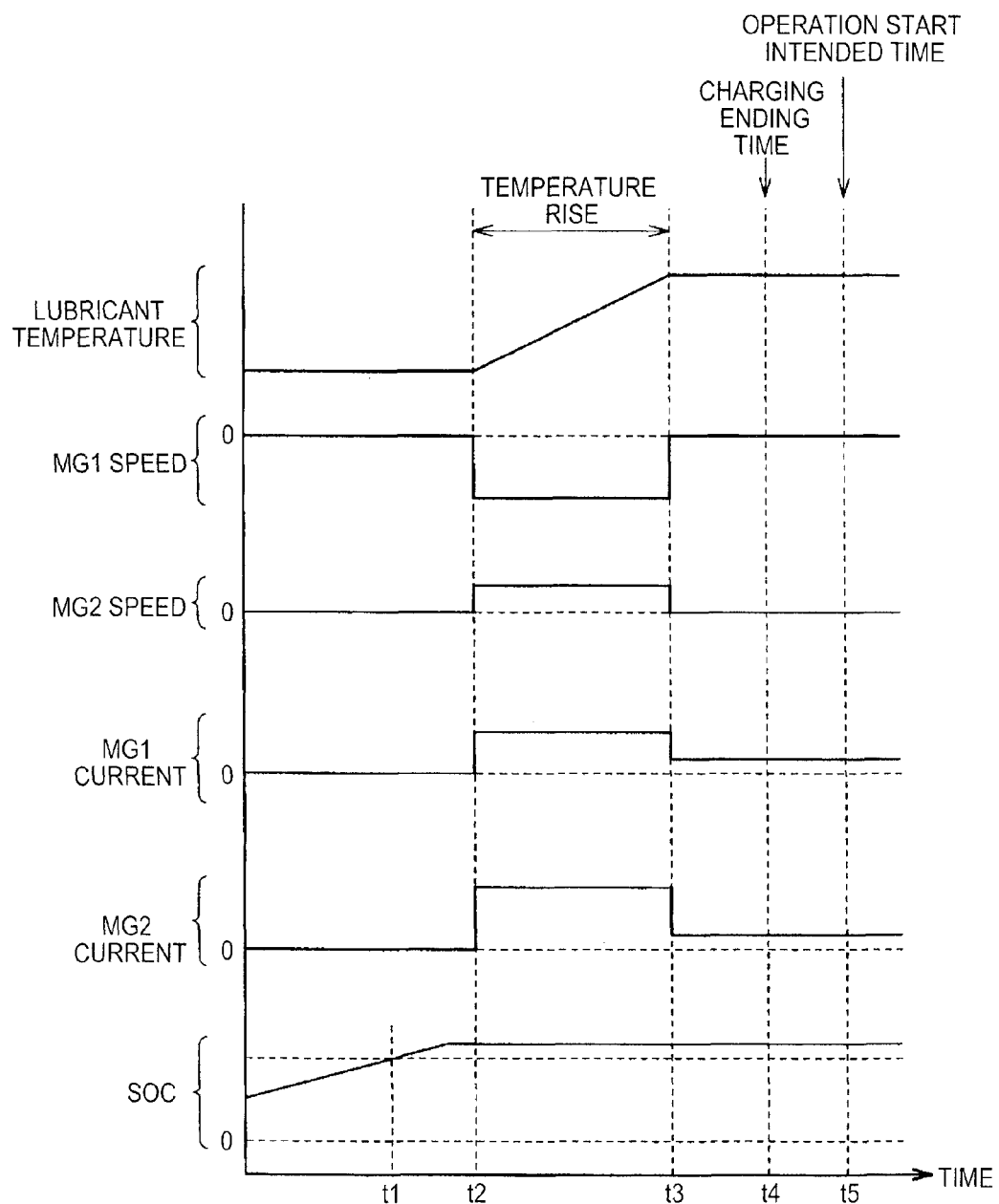
FIG. 9 is a time chart showing changes in major parameters due to, the lubricant warming control executed according to the flowchart shown in FIG. 8.

FIG. 9 is a time chart showing changes in major parameters which occur with the lubricant warming control. Referring to FIG. 9, when external charging (charging of the power storage device 54) using the external power supply is conducted, and the SOC of the power storage device 54 exceeds a predetermined threshold value at time t1, conditions for execution of the warming control are satisfied. Then, at time t2, the motor-generators MG1, MG2 are driven in the opposite rotational directions. As a result, the lubricant is warmed (i.e., its temperature is elevated), due to heat generated by energization of the motor-generators MG1, MG2, and stirring of the lubricant due to rotation of the motor-generators MG1, MG2. Since electric power can be supplied from the external power supply during the warming control, and electric power for use in the warming control is supplied from the external power supply to the motor-generators MG1, MG2, the SOC of the power storage device 54 is not reduced.

If the temperature of the lubricant reaches a predetermined temperature at time t3, current for keeping the temperature is passed through the motor-generators MG1, MG2. While the rotations of the motor-generators MG1, MG2 are stopped in the example of FIG. 9, the motor-generators MG1, MG2 may be rotated while the lubricant temperature is kept at the elevated level. Then, the external charging ending time comes at time t4, and the lubricant warming control as well as the external charging ends prior to the operation start intended time denoted by time t5.

Figure 10:
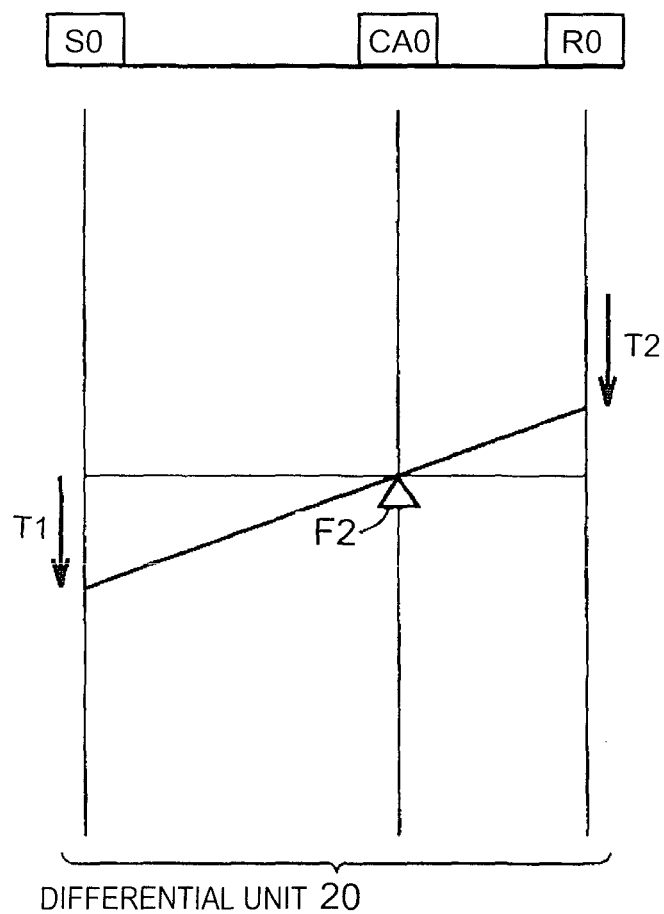
FIG. 10 is a nomographic chart of the differential unit shown in FIG. 3.

The heat generated by the motor-generators MG1, MG2 increases as the current flowing through the motor-generators MG1, MG2 is larger, so that the temperature of the lubricant can be quickly increased. In this embodiment, the one-way clutch F2 (see FIG. 3) is provided on the input shaft 22 (the output shaft of the engine 12) coupled to the carrier CA0 of the power split device 24 of the differential unit 20. Thus, as shown in the nomographic chart of FIG. 10, the motor-generators MG1, MG2 are driven so that the torque T1 of the motor-generator MG1 and the torque T2 of the motor-generator MG2 cancel each other with the one-way clutch F2 serving as a point of support, so that large torque can be generated at the motor-generators MG1, MG2. Namely, large current can be passed through the motor-generators MG1, MG2, and the temperature of the lubricant can be quickly increased.

As described above, in this embodiment, the warming control for raising the temperature of the lubricant is executed during execution of external charging using the external power supply; therefore, electric power for use in the warming control is not taken out of the power storage device 54. Furthermore, the automatic transmission 30 is provided between the differential unit 20 and the drive wheels 44, and the warming control is performed by rotating the motor-generators MG1, MG2 while the automatic transmission 30 is in the neutral state (power cutting-off state); therefore, the temperature of the lubricant is raised due to heat generated by energization of the motor-generators MG1, MG2, and the temperature of the lubricant is also raised due to stirring of the lubricant caused by rotation of the motor-generators MG1, MG2. Thus, according to this embodiment, the temperature of the lubricant is sufficiently elevated before the vehicle starts running, and the distance the hybrid vehicle 10 is able to travel can be extended as far as possible.

According to this embodiment, the electric oil pump starts being actuated before execution of the warming control; therefore, the clutches and shafts of the automatic transmission 30 are prevented from being burned out due to rotation of the motor-generators MG1, MG2 under the warming control.

According to this embodiment, the warming control is executed when the SOC of the power storage device 54 is higher than the predetermined threshold value, in other words, external charging is conducted so that the SOC becomes higher than the threshold value before the warming control is executed. Therefore, the warming control does not impede charging of the power storage device 54 which dominantly determines the distance the vehicle can travel in the EV running mode.

In this embodiment, the execution duration of the warming control is calculated, based on the temperature of the lubricant detected by the lubricant temperature sensor, the temperature of the outside air detected by the outside air temperature, etc. Then, the execution time of external charging (the time at which charging of the power storage device 54 is started) is determined, or charging power for external charging is increased (rapid charging is conducted), based on the execution duration of the warming control, so that the warming control can be accomplished with high reliability while assuring a sufficient amount of charging of the power storage device 54.

In the illustrated embodiment, the electric vehicle is in the form of the hybrid vehicle on which the engine 12 is installed. However, the range of application of this invention is not limited to the hybrid vehicle as described above, but may include an electric automobile on which no engine is installed, a fuel cell car on which a fuel cell is further installed as an energy source, and so forth.

While the hybrid vehicle 10 includes the automatic transmission 30, and the automatic transmission 30 is arranged to inhibit power from being transmitted to the drive wheels 44 during execution of the warming control; in the illustrated embodiment, another power transmission device capable of selectively permitting and inhibiting power transmission between the differential unit 20 and the drive wheels 44 may be provided, in place of the automatic transmission 30. For example, only a clutch may be provided in place of the automatic transmission 30, and the warming control may be executed when the clutch is released, or the clutch may be controlled to be placed in a released state upon execution of the warming control, for example.

In the illustrated embodiment, one of the motor-generators MG1, MG2 corresponds to one example of "first electric motor" according to the invention, and the other of the motor-generators MG1, MG2 corresponds to one example of "second electric motor" according to the invention. The automatic transmission 30 corresponds to one example of "power transmitting device" according to the invention, and the battery charger 56 and the power receiving unit 58 form one example of "charging device" according to the invention. The differential unit 20 corresponds to one example of "differential device" according to the invention, and the one-way clutch F2 corresponds to one example of "rotation inhibiting device" according to the invention.

It is to be understood that the embodiments disclosed herein are exemplary in all respects and not restrictive. The range of this invention is not defined by the description of the illustrated embodiments, but defined by the appended claims, and is intended to include all changes or modifications that would be made within the range of the claims and equivalents thereof.

What is claimed:

1. An electric vehicle, comprising:
   a power storage device configured to store electric power used for running the electric vehicle;
   a first electric motor configured to receive electric power from the power storage device, the first electric motor being configured to generate power;
   a power transmitting device provided between the first electric motor and drive wheels, the power transmitting device being configured to selectively permit and inhibit power transmission between the first electric motor and the drive wheels, the first electric motor being configured to be cooled by lubricant of the power transmitting device;
   a charging device configured to charge the power storage device using a power supply located outside of the electric vehicle; and
   a controller configured to perform warming control for raising a temperature of the lubricant by rotating the first electric motor, when the temperature of the lubricant is lower than a predetermined temperature at the time of execution of charging of the power storage device using the charging device and when the power transmitting device is in a power cutting-off state in which the power transmission is inhibited.

2. The electric vehicle according to claim 1, further comprising:
   an electric oil pump configured to be electrically driven so as to circulate the lubricant, wherein
   the controller is configured to start actuating the electric oil pump before execution of the warming control.

3. The electric vehicle according to claim 1, wherein
   the controller is configured to perform the warming control using electric power supplied from the power supply, when a quantity of a state indicative of a state of charge of the power storage device is larger than a predetermined value.

4. The electric vehicle according to claim 1, wherein
   the controller is configured to execute charging of the power storage device using the charging device, such that a quantity of state indicative of a state of charge of the power storage device becomes larger than a predetermined value before execution of the warming control.

5. The electric vehicle according to claim 4, wherein
   the controller is configured to estimate an execution duration of the warming control based on the temperature of the lubricant, and
   the controller is configured to change an execution time at which charging of the power storage device using the charging device is executed based on the estimated execution duration of the warming control.

6. The electric vehicle according to claim 1, further comprising:
   a timer with which a user of the electric vehicle sets a time, wherein
   the controller is configured to estimate an operation start scheduled time based on the time set with the timer, the operation start scheduled time being a time when the electric vehicle starts being operated, and the controller being configured to execute the warming control before the estimated operation start scheduled time.

7. The electric vehicle according to claim 1, wherein
   the controller is configured to execute the warming control before a scheduled ending time at which charging of the power storage device using the charging device ends.

8. The electric vehicle according to claim 1, further comprising:
   a second electric motor configured to be cooled by a coolant of the power transmitting device; and
   a power split device comprising a first rotary element coupled to the first electric motor, a second rotary element coupled to the second electric motor, and a third rotary element, wherein
   the controller is configured to rotate the second electric motor as well as the first electric motor during execution of the warming control.

9. The electric vehicle according to claim 8, further comprising:
   a rotation inhibiting device configured to inhibit rotation of the third rotary element during execution of the warming control, wherein
   the controller is configured to rotate the first electric motor and the second electric motor, such that torque produced by the first electric motor and torque produced by the second electric motor are balanced with respect to the third rotary element as a point of support, during execution of the warming control.

10. The electric vehicle according to claim 1, wherein
    the power transmitting device comprises a transmission.

11. The electric vehicle according to claim 1, wherein
    the power transmitting device includes a coupling device, and the coupling device is released to establish a neutral state in which power transmission of the power transmitting device is cut off.

12. The electric vehicle according to claim 11, wherein the coupling device is at least one of a clutch or a brake.

13. The electric vehicle according to claim 1, wherein the power cutting-off state of the power transmitting device is a neutral state in which power transmission between the first electric motor and the drive wheels is cut off or blocked.

14. The electric vehicle according to claim 1, wherein the controller is configured to perform the warming control for raising the temperature of the lubricant by rotating the first electric motor using electric power supplied from the power supply located outside of the electric vehicle.

15. A method of controlling an electric vehicle including a power storage device, a first electric motor, a power transmitting device, a charging device and a controller, the power storage device being configured to store electric power used for running the electric vehicle, the first electric motor being configured to receive electric power from the power storage device and generate power, the power transmitting device being provided between the first electric motor and drive wheels, the power transmitting device being configured to selectively permit and inhibit power transmission between the first electric motor and the drive wheels, the first electric motor being configured to be cooled by lubricant of the power transmitting device, and the charging device being configured to charge the power storage device using a power supply located outside of the electric vehicle, the method comprising:

determining, by the controller whether a temperature of the lubricant is lower than a predetermined temperature at the time of execution of charging of the power storage device using the charging device;

determining, by the controller, whether the power transmitting device is in a power cutting-off state in which the power transmission is inhibited; and performing, by the controller, warming control for raising the temperature of the lubricant by rotating the first electric motor, the controller determines that the temperature of the lubricant is lower than the predetermined temperature at the time of execution of charging of the power storage device, and the controller determines that the power transmitting device is in the power cutting-off state.

16. The method according to claim 15, further comprising establishing a neutral state in which power transmission of the power transmitting device is cut off by releasing a coupling device included in the power transmitting device.

17. The method according to claim 15, further comprising cutting off or blocking, by the controller, power transmission between the first electric motor and the drive wheels to establish the power cutting-off state of the power transmitting device as a neutral state.

18. The method according to claim 15, further comprising performing, by the controller, the warming control for raising the temperature of the lubricant by rotating the first electric motor using electric power supplied from the power supply located outside of the electric vehicle.

* * * * *